Jan. 6, 1953 R. B. HORN ET AL 2,624,595
COMBINED HITCH AND PLATFORM UNIT FOR TRACTORS
Filed Oct. 13, 1950
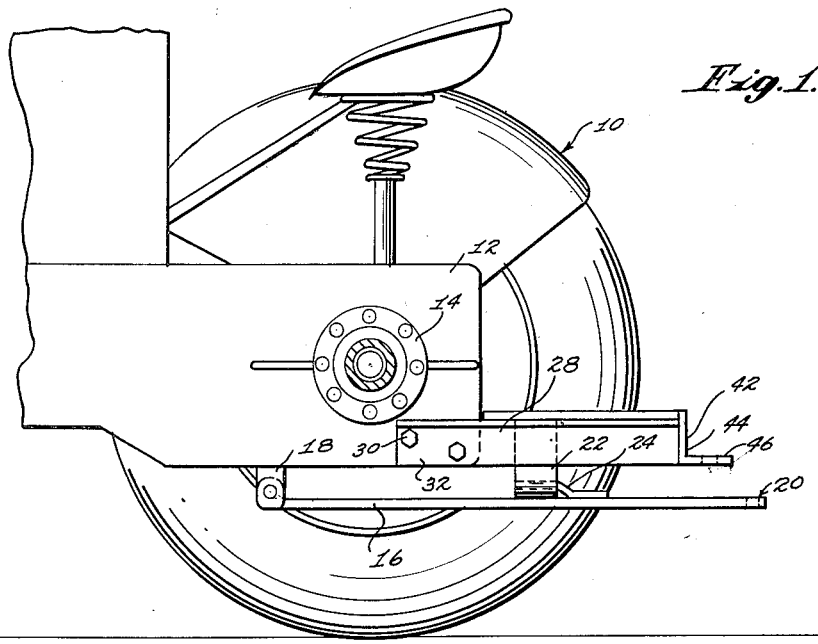
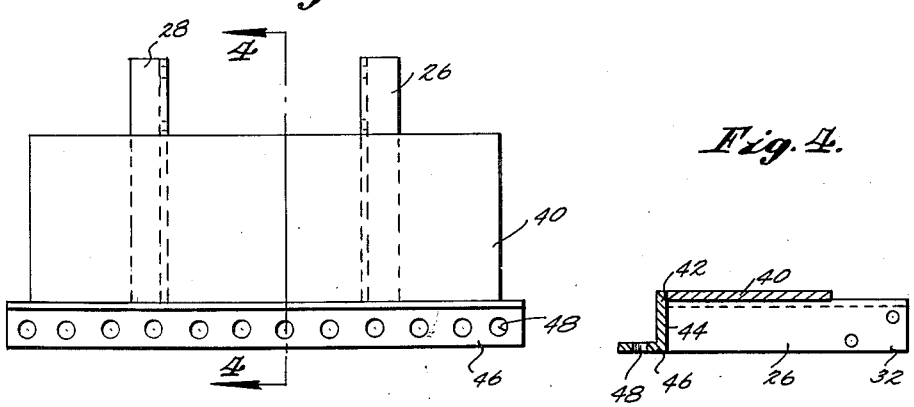
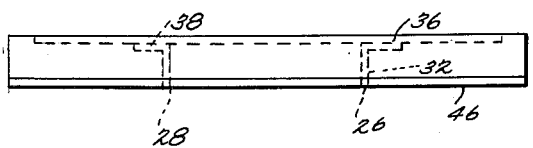
INVENTORS
ROBERT B. HORN
JOHN K. BAUER
BY
ATTORNEYS Patented Jan. 6, 1953

2,624,595

UNITED STATES PATENT OFFICE 2,624,595

COMBINED HITCH AND PLATFORM UNIT FOR TRACTORS

Robert B. Horn and John K. Bauer,
Winchester, Ind.

Application October 13, 1950, Serial No. 190,024

2 Claims. (Cl. 280—164)

This invention relates to a combined hitch and platform assembly for a tractor and has for its primary object to utilize the space rearwardly of the differential housing of a tractor and between the rear wheels for transporting articles, by providing a platform supported by the housing and extending rearwardly therefrom, the platform serving as a step for safe mounting of the tractor and terminating at its rearward edge in a transverse auxiliary hitch bar, which is disposed in a horizontal plane below the plane of the platform and which is formed with a series of vertical apertures for the reception of coupling pins.

Another object of this invention is to provide a platform and auxiliary hitch bar for attachment to the conventional hitch unit of a tractor, the platform providing means for safely and easily mounting the tractor to gain access to the seat, for permitting standing operation of the tractor by a driver and also transporting articles without requiring the employment of a drafted carrier.

These and ancillary objects and structural features of merit are attained by this invention, the preferred embodiment of which is set forth in the following description and illustrated in the accompanying drawing, wherein:

Figure 1 is a fragmentary side elevational view of a tractor, with the rear wheel removed and illustrating a platform and auxiliary hitch unit attached to the differential housing, the same embodying the features of this invention;

Figure 2 is a top plan view of the platform and auxiliary hitch unit;

Figure 3 is an end elevational view thereof, and,

Figure 4 is a cross sectional view taken on line 4—4 of Figure 3.

Referring now more particularly to the drawing, a conventional tractor 10 is illustrated, the same including a differential housing 12 and rear axle housings 14, which extend in opposite directions from the sides of the differential housing.

As is conventional, a drawbar 16 is journaled at its forward end in a depending bracket 18, which is carried by the underside of the differential housing, the drawbar projecting rearwardly of the differential housing and being formed at its rearward end with a vertical opening 20 for the reception of a coupling pin. A yoke 22 is seated on the drawbar, the web of the yoke being affixed to the drawbar by means of a clamp 24 carried by the drawbar and the legs of the yoke being conventionally affixed to a pair of arms, which are secured to the opposing sides of the differential housing and project rearwardly therefrom, the arms serving to rigidify and support the drawbar, adjacent its outer end.

In accordance with this invention, a pair of angle irons 26 and 28 are affixed by fasteners 30 to the opposing sides of the differential housing, with the fasteners 30 engaging the vertical flanges 32 of the angle irons. The horizontal flanges 36 and 38 of the angle irons project laterally outwardly in opposite directions and support a horizontal plate or platform 40 which is fixedly superimposed thereon, the opposing ends of the plate overlying the angle irons, as illustrated in Figure 3. The rearward edge of the plate terminates at the rearward ends of the angle irons 26 and 28 and an angle iron cross bar 42, serving as an auxiliary or alternate drawbar is affixed thereto, the angle iron cross bar affixed at the upper edge of its vertical flange 44 to the rearward edge of the plate 40 with its horizontal flange 46 disposed in a horizontal plane below the plane of the plate and projecting rearwardly thereof. The horizontal flange 46 is provided with a series of vertical openings 48 for the reception of coupling pins and constitutes an auxiliary offset hitch bar.

In use, it can be seen that the platform can be used for transporting articles and also can be used for transporting workmen from one field to another, the workmen standing on the platform behind the driver. The platform constitutes a step to permit the driver to safely and conveniently mount the tractor and reach the seat and also, is usable as a floor to permit the standing operation of the tractor.

The apertured flange 46 extends transversely of the arms and of the conventional hitch bar 16, the flange being spaced inwardly from the end of the hitch bar 16, so as not to interfere with the employment of the hitch bar 16.

Having thus described this invention, what is claimed is:

1. A removable platform for attachment to a differential housing of a tractor comprising a pair of angle irons arranged in spaced relation adapted to be positioned transversely and rearwardly of said housing at a level to correspond to a normal step from a ground surface with one end of each angle iron adjacent said housing, each of said irons including a vertical flange and horizontal flange projecting from the top of said vertical flange, detachable fastening elements extending through the portions of the vertical flanges adjacent said one end of said irons and engaging said housing for removably affixing said one end of said irons to said housing, a horizontally disposed plate bridging the horizontal flanges of said irons and secured to said flanges, said plate extending inwardly from the other end of said angle irons and terminating at a point adjacent to the affixed end portions of said angle irons and forming a platform, and another angle iron arranged transversely of said pair of angle irons adjacent the other ends of the latter, said another angle iron including a vertical flange and a horizontal flange projecting from the bottom of said vertical flange being positioned so that the vertical flange of said another angle iron abuts against the other ends of said pair of angle irons with the horizontal flange below and spaced from said platform, the vertical flange of said another angle iron being secured to the other ends of said pair of angle irons.

2. A removable platform for attachment to a differential housing of a tractor comprising a pair of angle irons arranged in spaced relation adapted to be positioned transversely and rearwardly of said housing at a level to correspond to a normal step from a ground surface with one end of each angle iron adjacent said housing, each of said irons including a vertical flange and horizontal flange projecting from the top of said vertical flange, detachable fastening elements extending through the portions of the vertical flanges adjacent said one end of said irons and engaging said housing for removably affixing said one end of said irons to said housing, a horizontally disposed plate bridging the horizontal flanges of said irons and secured to said flanges, said plate extending inwardly from the other end of said angle irons and terminating at a point adjacent to the affixed end portions of said angle irons and forming a platform, and another angle iron arranged transversely of said pair of angle irons adjacent the other ends of the latter, said another angle iron including a vertical flange and a horizontal flange projecting from the bottom of said vertical flange being positioned so that the vertical flange of said another angle iron abuts against the other ends of said pair of angle irons with the horizontal flange below and spaced from said platform, the vertical flange of said another angle iron being secured to the other ends of said pair of angle irons, the horizontal flange of said another angle iron being provided with a plurality of openings arranged in spaced relation therealong, each of said openings being adapted to receive a coupling pin.

ROBERT B. HORN.
JOHN K. BAUER.

REFERENCES CITED

The following references are of record in the file of this patent:

UNITED STATES PATENTS

| Number | Name | Date |
|---|---|---|
| 1,877,958 | Paul | Sept. 20, 1932 |
| 2,167,848 | Ostenberg | Aug. 1, 1939 |
| 2,341,417 | Atchison | Feb. 8, 1944 |

FOREIGN PATENTS

| Number | Country | Date |
|---|---|---|
| 589,041 | Great Britain | June 10, 1947 |
| 593,201 | Great Britain | Oct. 10, 1947 |